(12) United States Patent
Jonsson et al.

(10) Patent No.: US 7,478,978 B2
(45) Date of Patent: Jan. 20, 2009

(54) CUTTING TOOL AND TOOL HEAD

(75) Inventors: Christer Jonsson, Hedemora (SE); Bengt Högrelius, Fagersta (SE); Jan Eriksson, Fagersta (SE); Christer Ejderklint, Fagersta (SE); Carl-Erik Berglöw, Fagersta (SE); Jorma Koskinen, Fagersta (SE); Jonas Boman, Falun (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 11/947,927

(22) Filed: Nov. 30, 2007

(65) Prior Publication Data
US 2008/0069649 A1 Mar. 20, 2008

Related U.S. Application Data

(63) Continuation of application No. 11/162,631, filed on Sep. 16, 2005, now Pat. No. 7,329,073.

(30) Foreign Application Priority Data
Sep. 23, 2004 (SE) .................................... 0402307

(51) Int. Cl.
*B23B 31/11* (2006.01)
*B23C 5/26* (2006.01)
(52) U.S. Cl. .................. 408/233; 408/239 A; 279/8

(58) Field of Classification Search .................. 407/53, 407/54; 408/713, 226, 231–233; 279/8; 409/232, 234
See application file for complete search history.

(56) References Cited

U.S. PATENT DOCUMENTS

| 1,083,747 | A | * | 1/1914 | Kocher | 408/233 |
| 3,304,818 | A | * | 2/1967 | Heaton | 72/409.18 |
| 3,521,507 | A | * | 7/1970 | Yogus et al. | 408/199 |
| 5,695,304 | A | * | 12/1997 | Ebert | 408/227 |

* cited by examiner

*Primary Examiner*—Willmon Fridie
(74) *Attorney, Agent, or Firm*—WRB-IP LLP

(57) ABSTRACT

The present invention relates to a tool head preferably for milling. The tool head is connectable to a toolholder. The tool head includes a cutting portion and a mounting portion. The mounting portion includes an axial stop surface and a radial stop surface. Dimensions and tolerances of the axial stop surface and the radial stop surface are selected such that the axial stop surface will abut an axial stop on the toolholder to prevent axial movement of the toolholder relative to the tool head beyond the axial stop surface and the radial stop surface will be disposed proximate a radial stop of the toolholder to limit radial movement of the tool head relative to the toolholder when an integral fastening portion of the tool head and an integral fastening portion of the toolholder are fastened directly to one another and the axial stop surface and the axial stop abut.

16 Claims, 3 Drawing Sheets

CUTTING TOOL AND TOOL HEAD

The present application is a continuation of application Ser. No. 11/162,631, filed Sep. 16, 2005 now U.S. Pat. No. 7,329,073.

BACKGROUND

It is often extremely important in operations such as machining of metal or other workpieces that the location of a cutting edge of a cutting tool be precisely controlled and controllable. Complex machinery is provided to mill, drill, bore, or otherwise perform shaping operations on workpieces by precisely controlling the location of a cutting tool relative to the workpiece. Cutting tools often include replaceable inserts or cutting heads that are attached to permanent toolholders such as shanks that are moved relative to the workpiece.

The accuracy of the mounting of the cutting inserts or heads relative to the toolholder is a factor in the accuracy of the operation to be performed on the workpiece. In the case, for example, of a rotating tool, an insert or tool head that is displaced axially relative to a rotating shank to which it is attached can damage the workpiece and may necessitate the rejection of an expensive part. It is therefore desirable to minimize the possibility of movement of an insert or tool head relative to a toolholder.

According to an aspect of the present invention, a cutting tool includes a toolholder including an end portion, the end portion including an axial stop, and a radial stop. The cutting tool also includes a replaceable tool head having an axial stop surface, and a radial stop surface. The end portion is at least partially receivable in an internal opening in the tool head up to a position at which the axial stop abuts the axial stop surface to prevent axial movement of the toolholder relative to the tool head beyond the axial stop surface. The radial stop surface and the radial stop are disposed proximate one another to limit radial movement of the tool head relative to the toolholder when an integral fastening portion of the tool head and an integral fastening portion of the toolholder are fastened directly to one another and the axial stop surface and the axial stop abut.

According to another aspect of the present invention, a tool head includes a cutting portion and a mounting portion, the mounting portion including an axial stop surface, and a radial stop surface. Dimensions and tolerances of the axial stop surface and the radial stop surface are selected such that the axial stop surface will abut an axial stop on a toolholder to prevent axial movement of the toolholder relative to the tool head beyond the axial stop surface and the radial stop surface will be disposed proximate a radial stop of the toolholder to limit radial movement of the tool head relative to the toolholder when an integral fastening portion of the tool head and an integral fastening portion of the toolholder are fastened directly to one another and the axial stop surface and the axial stop abut.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
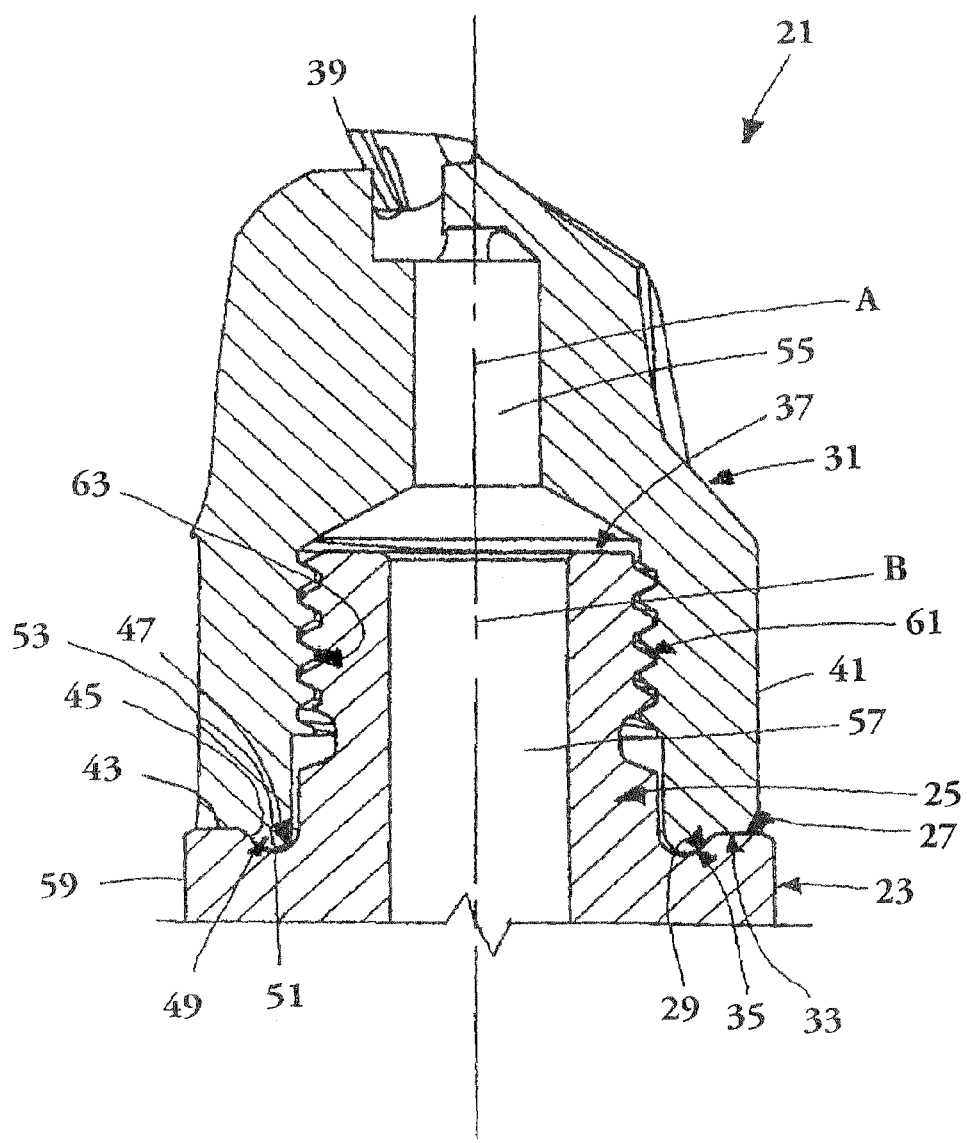
FIG. 1 is a side cross-sectional view of a tool according to an embodiment of the present invention.
Figure 2:
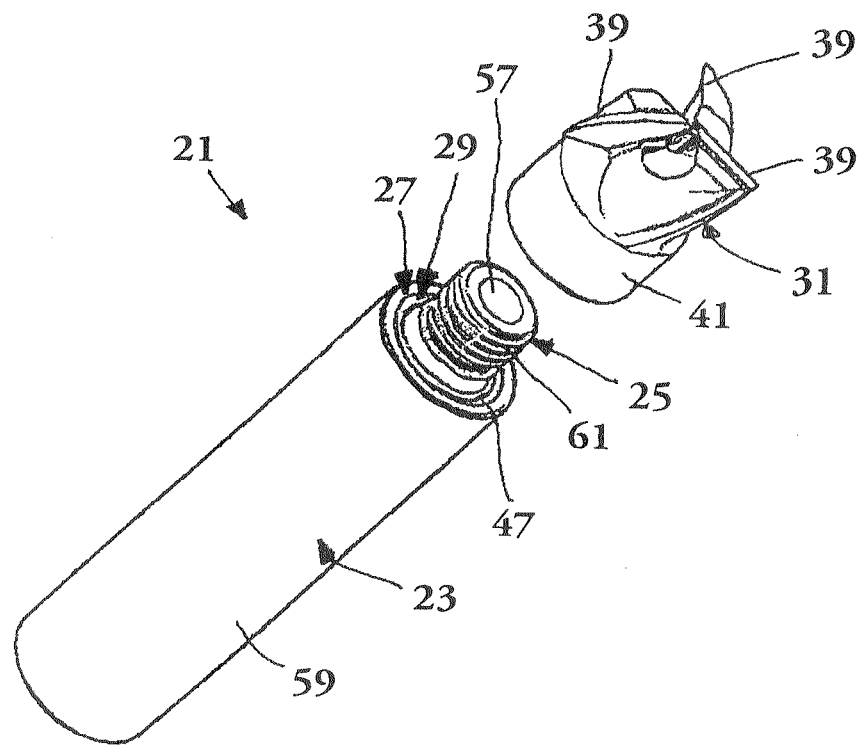
FIG. 2 is a top perspective view of a tool according to an embodiment of the present invention showing a cutting head and a toolholder according to embodiments of the invention separated.
Figure 3:
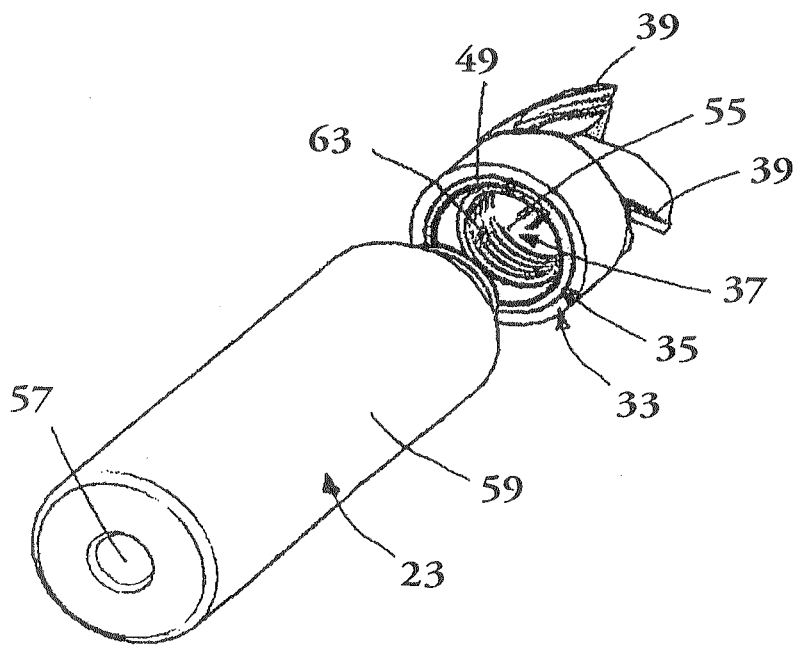
FIG. 3 is a bottom perspective view of a tool according to an embodiment of the present invention showing a cutting head and a toolholder according to embodiments of the invention separated.

A tool 21 according to an embodiment of the present invention is shown in FIGS. 1-3. The tool 21 includes a toolholder in the form of a shank 23 including an end portion 25. The end portion 25 includes an axial stop 27, and a radial stop 29. The shank 23 shown here is a circular cylinder, however, the shank may have other shapes as desired, such as, for example, a hexagonal shape, a splined shape, etc. The present invention has application to all manner of tools to which replaceable cutting heads or inserts are attachable, such as milling, drilling, boring, turning, and similar tools. The embodiment illustrated in FIGS. 1-3 is a rotating tool.

The tool 21 also includes a replaceable insert or tool head 31 having an axial stop surface 33, and a radial stop surface 35. In the embodiment of FIGS. 1-3, the end portion 25 is at least partially receivable in an internal opening 37 in the tool head 31 up to a position at which the axial stop 27 abuts the axial stop surface 33. When the axial stop 27 and the axial stop surface 33 abut, the radial stop surface 35 and the radial stop 29 are disposed proximate one another to permit limited radial movement of the tool head 31 relative to the shank 23. At the same time, fastening portions, such as threaded members 61 and 63 of the toolholder 23 and the tool head 31 can be fastened directly to one another. The fastening portions can be integral with the toolholder 23 and tool head 31 to facilitate proper orientation of the tool head relative to the toolholder. By providing fastening portions that are integral with the toolholder 23 and tool head 31, the number of components forming the tool and the complexity of the tool can be minimized, and the number of variables that can result in inaccurate positioning of the tool head relative to the toolholder can be minimized. Ordinarily, the radial stop surface 35 and the radial stop 29 will be close to one another but sufficiently distant to one another until the axial stop 27 and the axial stop surface 33 abut such that movement of the axial stop and the axial stop surface relative to one another to an abutting position will not be impeded by the radial stop and the radial stop surface. The closer the radial stop surface 35 and the radial stop 29 are when the axial stop surface 33 and the axial stop 27 abut, the better will be the ability of the radial stop surface and the radial stop to limit radial movement of the tool head 31 relative to the shank 23. It will be noted that other embodiments of the invention may not include having, e.g., a portion of a toolholder received in a portion of an insert or cutting head as in the embodiments of FIGS. 1-3. The tool head 31 may be, but is not necessarily, made out of a material such as cemented carbide that may be harder than the material, such as high speed steel, from which the shank 23 may be made.

Ordinarily, dimensions and dimensional tolerances of the radial stop surface 35 and the radial stop 29 will be selected such that they will not contact or will barely contact when there is no load on the shank 23 and tool head 31 so that the contact between the shank 23 and the tool head 31 will not be overdetermined. However, those dimensions and tolerances are further selected such that the radial stop 29 and the radial stop surface 35 are located close enough to one another that the radial stop will contact the radial stop surface upon application of some non-zero load to the tool head 31 perpendicular to its axis A. In this way, unintended radial movement of the tool head 31 relative to the shank 23 during operation can be controlled.

The tool head 31 will ordinarily include cutting edges 39 or pockets (not shown) for mounting inserts with cutting edges and may be fluted along part or all of its length.

In the embodiment shown in FIGS. 1-3, the axial stop 27 includes a substantially flat surface 43 substantially perpendicular to an axis B of the shank. The surface 43 need not, however, be perpendicular and may be partially or entirely at an angle to the perpendicular, and may be curved or otherwise non-flat. In the embodiment of the invention shown in FIGS. 1-3, the radial stop 29 includes a surface 45 for abutment against the radial stop surface 35 of the tool head 31 that defines a non-zero angle with the axis B of the shank 23. In this embodiment, the surface 45 faces toward the axis B of the shank 23.

In the embodiment of FIGS. 1-3, the radial stop 29 is part of an annular groove 47 around the axis B of the shank 23, and the radial stop surface 35 is part of an annular protrusion 49 around the axis A of the tool head 31. If desired, the radial stop may be part of an annular protrusion and the radial stop a part of an annular groove. When the axial stop 27 and the axial stop surface 33 abut, an end 51 of the annular protrusion 49 and a bottom 53 of the annular groove 47 are separated by a non-zero distance to ensure that the axial stop 27 will abut the axial stop surface 33. Annular grooves and recesses are useful in embodiments such as shown in FIGS. 1-3 wherein the tool head 31 is screwed onto the shank 23, however, in other embodiments where the tool head and the shank are connected in some other way, shapes other than annular grooves and recesses may be used to form part of the radial stop and radial stop surfaces.

The tool head 31 can include at least one tool head passage 55 and the shank 23 can include at least one shank passage 57. As seen in FIG. 1, the at least one tool head passage 55 and the at least one shank passage 57 can communicate when the tool head 31 is mounted relative to the shank 23. The communicating passages can be used, for example, to supply lubricant or coolant to the cutting edges 39.

In the embodiment of FIGS. 1-3, the external portion 41 of the tool head 31 proximate the axial stop surface 33 is circularly cylindrical. The external portion 41 may be useful as a surface for a wrench or other tool to contact during mounting of the tool head 31 relative to the shank 23. If an external portion is provided, it may be any suitable shape, such as hexagonal or splined, as desired. An external surface portion 59 of the shank 23 may be circularly cylindrical as shown in FIGS. 2-3, or any other desired shape, such as hexagonal, splined, etc.

In the embodiment of FIGS. 1-3, the end portion 25 includes an integral fastening portion in the form of an externally threaded portion 61 and the internal opening 37 includes an integral fastening portion in the form of an internally threaded portion 63 adapted to engage with the externally threaded portion. In this embodiment, as seen in, e.g., FIG. 1, the radial stop 29 and the radial stop surface 35 may be considered to merge into the axial stop 27 and the axial stop surface 33, respectively. For purposes of describing the relative positions of these surfaces, however, because the substantial majority of the radial stop 29 and the radial stop surface 35 are disposed below the axial stop 27 and the axial stop surface 33, respectively, on the shank 23, the axial stop 27 shall be considered to be disposed between the externally threaded portion 61 and the radial stop 29 and, on the tool head 31, the axial stop surface 33 shall be considered to be disposed between the internally threaded portion 63 and the radial stop surface 35. When the tool 21 is a rotating tool, the internally threaded portion 63 and the externally threaded portion 61 will ordinarily be threaded such that, when the rotating tool is rotated in an intended working direction, the tool head 31 is tightened on the shank 23. To ensure that the threads on the externally threaded portion 61 and the internally threaded portion 63 do not function as radial stops and radial stop surfaces, an average distance between the radial stop 29 and the radial stop surface 35 will ordinarily be less than an average distance between the externally threaded portion and the internally threaded portion at major and minor thread diameters thereof.

Thus, according to an embodiment of the invention seen in FIGS. 1-3, the cutting tool 21 includes a toolholder 23, the end portion 25 of the toolholder including the axial stop 27 and the radial stop 29. The axial stop 27 can include a surface substantially perpendicular 43 to an axis B of the toolholder 23. The radial stop 29 can include a surface 45 facing toward the axis B of the toolholder 23.

Additionally, a tool head 31 according to an embodiment of the invention seen in FIGS. 1-3, comprises a cutting portion and a mounting portion. The mounting portion includes an axial stop surface 33 and a radial stop surface 35. The radial stop surface 35 includes a surface 45 facing away from an axis A of the tool head 31. Dimensions and tolerances of the axial stop surface and the radial stop surface are selected such that the axial stop surface will abut the axial stop 27 on the toolholder 23 to prevent axial movement of the toolholder relative to the tool head 31 beyond the axial stop surface 33 and the radial stop surface 35 will be disposed proximate a radial stop 29 of the toolholder 23 to limit radial movement of the tool head 31 relative to the toolholder when an integral fastening portion 63 of the tool head and an integral fastening portion 61 of the toolholder 23 are fastened directly to one another and the axial stop surface and the axial stop abut. When the axial stop 27 and the axial stop surface 33 abut, an end 51 of the annular protrusion 49 and a bottom 53 of the annular groove 47 are separated by a non-zero distance.

The radial stop 29 can be part of an annular groove 47 around the axis B of the toolholder 23. The radial stop surface 35 can be part of an annular protrusion 49 around the axis A of the tool head 31. The axial stop surface 33 can be disposed between the internally threaded portion 63 and the radial stop surface 35. Of course, if desired, the radial stop can be a protrusion and the radial stop surface can be a groove.

The tool head 31 can include at least one tool head passage 55 and the toolholder 23 includes at least one toolholder passage 57. The at least one tool head passage 55 and the at least one toolholder passage 57 can communicate when the tool head 31 is mounted relative to the shank 23.

In the embodiment of FIGS. 1-3, the tool head 31 includes an internal opening 37, and the internal opening 37 includes an internally threaded portion 63 forming at least part of the integral fastening portion and is adapted to engage with an externally threaded portion 61 forming at least part of the integral fastening portion of the toolholder 23. It will be appreciated, of course, that the toolholder can include the internal opening with the internal threads and the tool head can include the externally threaded portion.

Figure 4:
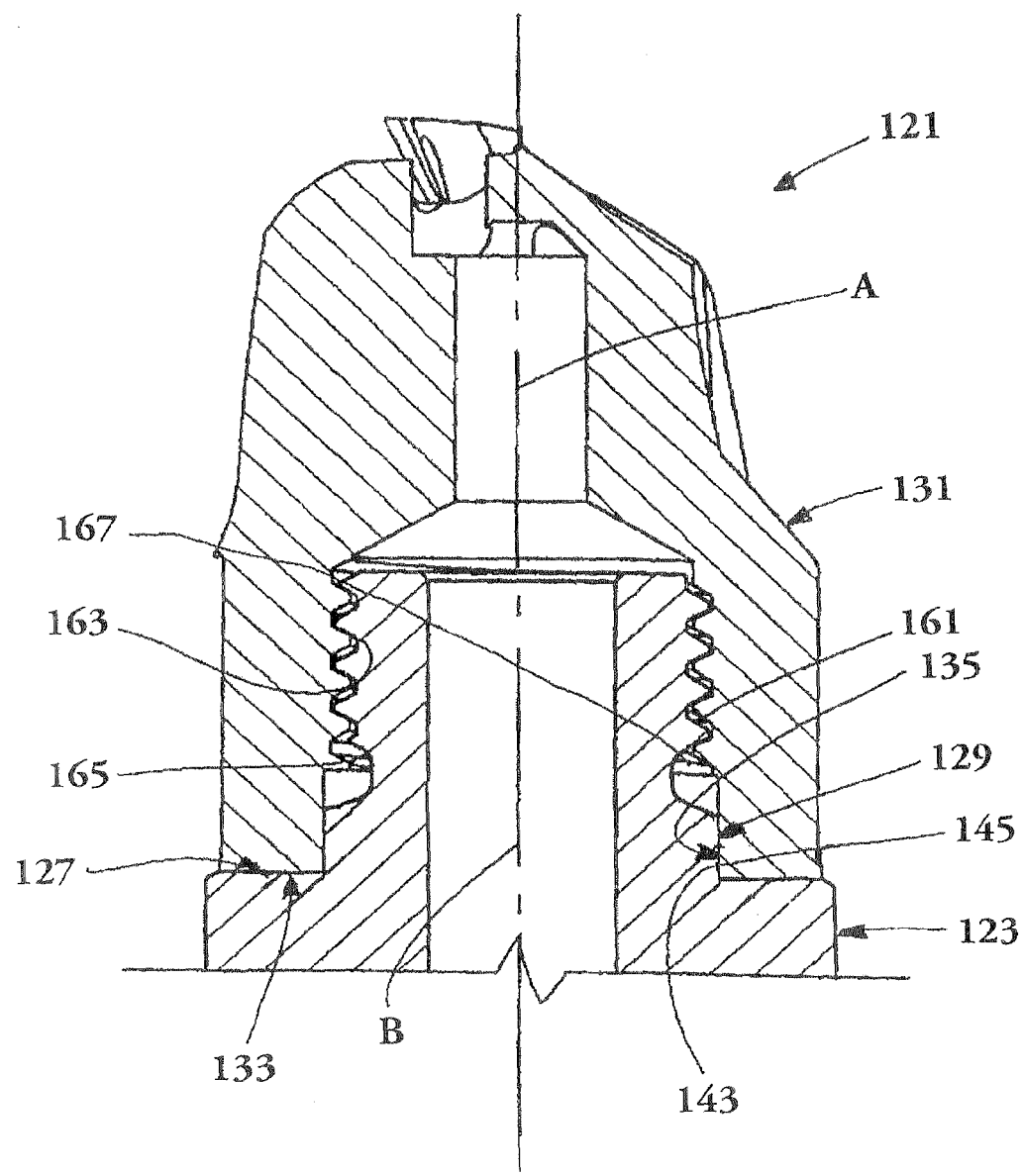
FIG. 4 is a side cross-sectional view of a tool according to another embodiment of the present invention.

FIG. 4 shows another embodiment of a tool 121 according to the present invention. The tool 121 can be the same as the tool 21 described in connection with FIGS. 1-3 in all respects save that no annular groove or recess arrangement is provided. In the tool 121, the radial stop 129 may include a surface 145 substantially parallel to or slightly inclined relative to an axis B of the shank 123 and the radial stopping surface 135 may include a surface 143 similarly substantially parallel to or slightly inclined relative to an axis A of the tool head 131. In this embodiment, the radial stop 129 includes a surface 145 facing away from the axis B of the shank 123 and the radial stop surface 135 includes a surface 143 facing toward the axis A of the tool head 131.

In an embodiment of the tool of FIG. 4 having a threaded connection, the radial stop 129 can include an unthreaded surface 145 disposed at an end 165 of a fastening portion in the form of an externally threaded portion 161 and the radial stop surface 135 can include an unthreaded surface disposed at an end 167 of a fastening portion in the form of an internally threaded portion 163 of the tool head 131. The fastening portions can be integral with the toolholder 123 and the tool head 131 to facilitate proper orientation of the tool head relative to the toolholder. In the embodiment of FIG. 4, the radial stop 129 is disposed between the externally threaded portion 161 and the axial stop 127 of the shank, and the radial stop surface 135 is disposed between the internally threaded portion 163 and the axial stop surface 133 of the tool head. If desired, the radial stop and radial stop surface may be disposed at ends of the externally and internally threaded portions opposite the axial stop and axial stop surface.

The following description with respect to the tool head 31 of FIGS. 1-3 will generally apply as well to the tool head 131 of FIG. 4, except where otherwise noted. The tool head 31 includes a cutting portion and a mounting portion. The mounting portion includes the axial stop surface 33, and the radial stop surface 35. Dimensions and tolerances of the axial stop surface 33 and the radial stop surface 35 are selected such that the axial stop surface will abut the axial stop 27 on the toolholder 23 to prevent axial movement of the toolholder relative to the tool head beyond the axial stop surface and the radial stop surface 35 will be disposed proximate the radial stop 29 of the toolholder to limit radial movement of the tool head 31 relative to the toolholder or shank 23 when the axial stop surface and the axial stop abut.

In the tool head 31 of FIGS. 1-3, the axial stop surface 33 includes a surface substantially perpendicular to the axis A of the tool head. However, the axial stop surface need not be perpendicular in whole or in part to the axis of the tool head. In FIGS. 1-3, the radial stop surface 35 includes a surface 45 that defines a non-zero angle with the axis A of the tool head 31. Here, the radial stop surface 35 includes a surface 45 generally facing away from the axis A of the tool head 31. In FIGS. 1-3, the radial stop surface 35 is part of an annular protrusion 49 around the axis A of the tool head, although an annular recess or some other suitable shape may be provided, instead.

The tool head 31 can include the internal opening 37. The internal opening 37 can include the internally threaded portion 63 adapted to engage with the externally threaded portion 61 of the toolholder or shank 23. The axial stop surface 33 can be disposed between the internally threaded portion 63 and the radial stop surface 35.

In the embodiment of FIG. 4, the radial stop surface 135 can include a surface substantially parallel to or forming a slight angle relative to the axis A of the tool head 131. The radial stop surface 135 includes a surface facing toward the axis A of the tool head 131.

The tool head 131 can include an internal opening 137 and the radial stop surface 135 can form at least part of the internal opening. The radial stop surface 135 can include an unthreaded surface disposed at the end 167 of the externally threaded portion 161 disposed between the internally threaded portion and the axial stop surface 133 or at an end of the externally threaded portion opposite the axial stop surface.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The invention claimed is:

1. A tool head, comprising:
   a cutting portion; and
   a mounting portion, the mounting portion including
      an axial stop surface for abutting an axial stop on a toolholder to prevent axial movement of the toolholder relative to the tool head beyond the axial stop surface, and
      a radial stop surface; and
      an integral fastening portion for fastening to a fastening portion of the toolholder so that the axial stop surface and the axial stop abut and the radial stop surface is disposed proximate a radial stop of the toolholder to limit radial movement of the tool head relative to the toolholder, the radial stop surface forming no part of the integral fastening portion of the tool head.

2. The tool head as set forth in claim 1, wherein the axial stop surface includes a surface substantially perpendicular to an axis of the tool head.

3. The tool head as set forth in claim 1, wherein the radial stop surface includes a surface substantially parallel to an axis of the tool head.

4. The tool head as set forth in claim 3, wherein the axial stop surface includes a surface substantially perpendicular to the axis of the tool head.

5. The tool head as set forth in claim 1, wherein the radial stop surface includes a surface that defines a non-zero angle with an axis of the tool head.

6. The tool head as set forth in claim 5, wherein the axial stop surface includes a surface substantially perpendicular to an axis of the tool head.

7. The tool head as set forth in claim 1, wherein the radial stop surface includes a surface facing away from an axis of the tool head.

8. The tool head as set forth in claim 1, wherein the radial stop surface includes a surface facing toward an axis of the tool head.

9. The tool head as set forth in claim 1, wherein the radial stop surface is part of an annular protrusion around an axis of the tool head.

10. The tool head as set forth in claim 1, wherein the tool head includes an internal opening.

11. The tool head as set forth in claim 10, wherein the radial stop surface forms at least part of the internal opening.

12. The tool head as set forth in claim 1, wherein one of the tool head and the toolholder includes an internal opening, and the one of the tool head and the toolholder that includes the internal opening includes an internally threaded portion forming at least part of the integral fastening portion and is adapted to engage with an externally threaded portion forming at least part of the integral fastening portion of the one of the tool head and the toolholder that does not include the internal opening.

13. The tool head as set forth in claim 12, wherein the radial stop surface includes an unthreaded surface disposed at an end of the internally threaded portion.

14. The tool head as set forth in claim 12, wherein the radial stop surface is disposed between the internally threaded portion and the axial stop surface.

15. The tool head as set forth in claim 12, wherein the axial stop surface is disposed between the internally threaded portion and the radial stop surface.

16. The tool head as set forth in claim 12, wherein the tool head includes the internal opening.

* * * * *